Figure 1:
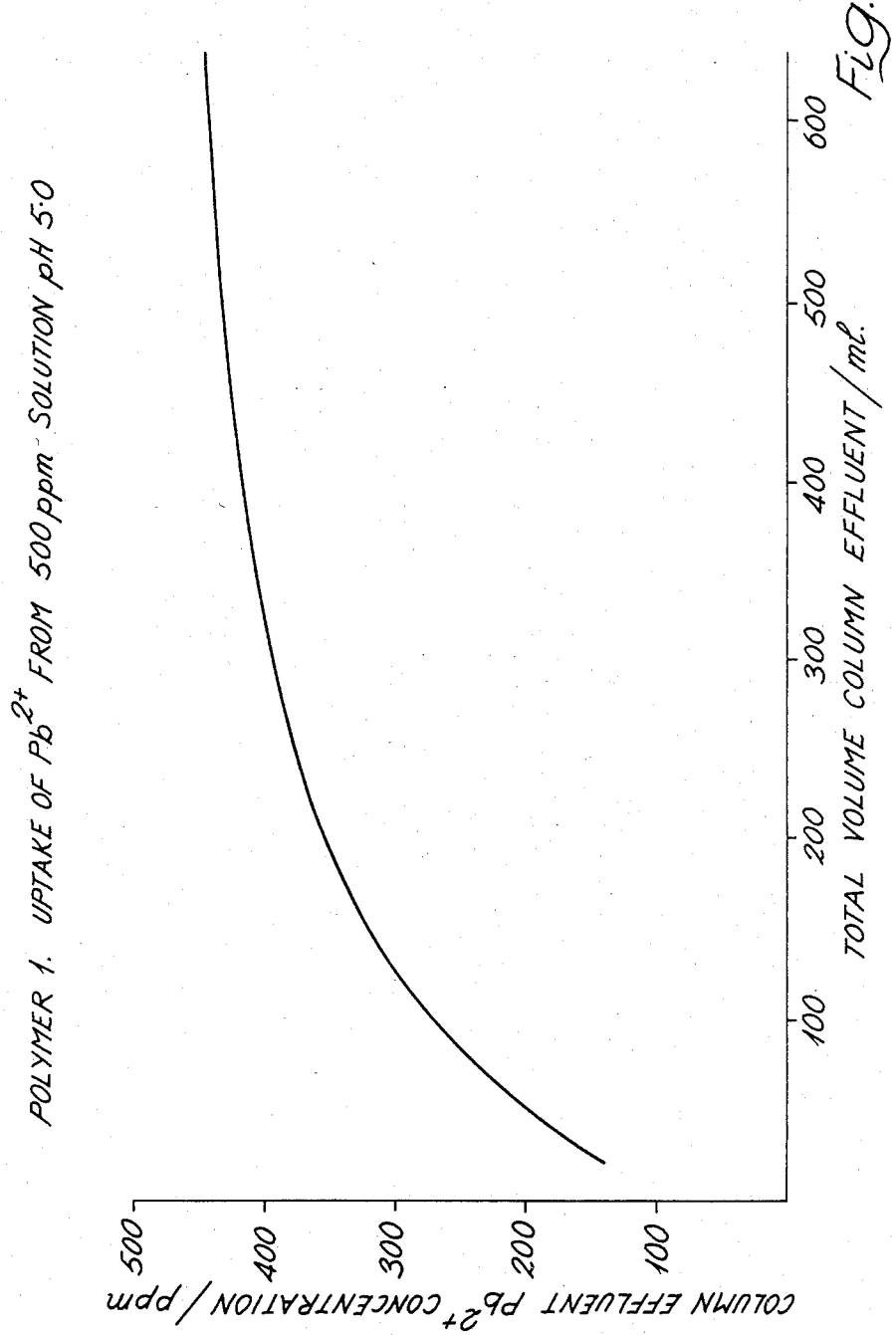

United States Patent [19]

Rowley et al.

[11] Patent Number: 4,500,497

[45] Date of Patent: Feb. 19, 1985

[54] REMOVAL OF TOXIC METALS FROM AQUEOUS SOLUTION

[75] Inventors: Alan G. Rowley, Loanhead, Scotland; Fiona M. Husband, Rushey Mead, England

[73] Assignee: National Research Development Corporation, London, England

[21] Appl. No.: 384,256

[22] Filed: Jun. 2, 1982

[30] Foreign Application Priority Data

Jun. 3, 1981 [GB] United Kingdom ............ 8116974

[51] Int. Cl.³ .............................................. C01G 17/00
[52] U.S. Cl. ........................................ 423/89; 423/99; 525/207; 525/285
[58] Field of Search .................................. 423/89, 99

[56] References Cited

FOREIGN PATENT DOCUMENTS 03980 1/1975 Japan.
75988 6/1975 Japan.

OTHER PUBLICATIONS

Chemical Abstracts, 97-28351s.
Chemical Abstracts, 83-102949x.
Chemical Abstracts, 86-47100y.

Primary Examiner—John Doll
Assistant Examiner—Wayne A. Langel
Attorney, Agent, or Firm—Finnegan, Henderson, Farabow, Garrett & Dunner

[57] ABSTRACT

Insolubilized poly(maleic anhydride) is disclosed for use in a method of removing heavy metals, particularly lead, from aqueous media.

16 Claims, 2 Drawing Figures

POLYMER 1. UPTAKE OF $Pb^{2+}$ FROM 500 ppm SOLUTION pH 5·0

REMOVAL OF TOXIC METALS FROM AQUEOUS SOLUTION

This invention relates to the removal of heavy metals, in particular mercury, zinc, cadmium and especially lead, from aqueous, e.g. effluent, media.

The presence of heavy, generally toxic metals, e.g. as the result of industrial pollution, in surface water and water supply is an increasing problem. Previous attempts to remove dissolved heavy metals, e.g. from industrial effluent, have involved the use of metal absorbing polymers. Thus for example conventional cation exchange resins can be used for metal absorption under some circumstances but their use is limited by pH and by the fact that they are relatively indiscriminate as regards cation absorption. Thus they are of little value where effluents containing substantial concentrations of relatively innocuous metals, e.g. alkali and alkaline earth metals, are being treated since the resin will rapidly become saturated with these innocuous metal ions. In addition polymeric absorbents bearing relatively selective metal chelating groups are available, such as Chelex 100, which is a polystyrene based ion exchange resin the active groups being paired iminodiacetate ions. However, these materials are inevitably expensive to manufacture and are suited to small scale use, for example in a laboratory, rather than in large scale water clean-up. In addition these materials are often difficult to regenerate effectively and economically.

It has been found that heavy metals, e.g. mercury, zinc, cadmium, and in particular, lead, can be absorbed from aqueous media using insolubilized poly(maleic anhydride). The invention accordingly provides a method of removing a heavy metal from an aqueous medium using such material.

The insolubilizing agent may suitably be a polymer such as polystryrene to which the poly(maleic anhydride) compound is bound.

The invention also provides, as novel material, insolubilised poly(maleic anhydride).

The poly(maleic anhydride) may be insolubilised by cross-linking; or by copolymerisation of poly(maleic anhydride) or monomeric maleic anhydride with a hydrophobic polymer or comonomer, preferably by copolymerisation of monomeric maleic anhydride with a hydrophobic polymer which may itself be cross-linked; for example, a substituted or unsubstituted polystyrene.

The structure of poly(maleic anhydride) has not yet been fully elucidated but the preferred polymers of this invention are water-soluble polyelectrolytes which have IR absorption maxima at 3,480 to 3,500 cm$^{-1}$, 1,670 to 1,690 cm$^{-1}$ and 1,190 to 1,210 cm$^{-1}$. It is postulated that the polymer obtained by polymerisation of maleic anhydride according to this invention has a structure similar to that of fulvic acid, a constituent of the humic components of soils (Nature, H. A. Anderson and J. D. Russell, Vol. 260, 1976, 597). The humic components of soils represent the product decay of organic detritus and are involved in the transporting of metals ions through soil. These humic components comprise humic acid and fulvic acid, which is that fraction of the humic materials soluble in mineral acid. These components are found both in the soil and in surface water. Fulvic acid is particularly important as a natural chelating agent and has been found to have a specific affinity for heavy metals. However neither fulvic acid, nor poly(maleic anhydride), are useful chelating agents for effluent clean-up since they, and their chelates, are water-soluble.

Suitable insolubilised poly(maleic anhydride) according to the invention includes poly(maleic anhydride) bound to polystyrene, which renders it insoluble in water. The polystyrene acts as a non-polar support of the poly(maleic anhydride). The poly(maleic anhydride) bound to polystyrene is relatively cheap to prepare and can easily be regenerated for reuse. Also the material has a good selectivity for heavy metals, especially mercury, zinc, cadmium and in particular lead, and accordingly in use does not become saturated by innocuous metals which may be present in the effluent being treated. Thus the material can effectively be used for large scale clean-up.

This invention also provides a process comprising cross-linking poly(maleic anhydride) or copolymerising poly(maleic anhydride) or monomeric maleic anhydride with a hydrophobic polymer or comonomer, preferably wherein monomeric maleic anhydride is copolymerised with a hydrophobic polymer which may itself be cross-linked; for example a substituted or unsubstituted polystyrene. In a particularly preferred embodiment of this invention the polymerisation of the monomeric maleic anhydride is initiated by a Lewis base, especially a compound of the formula:

for example wherein $R_n$ represents a polystyryl group; wherein at least on of $R_1$ and $R_2$ represents a phenyl group; wherein M represents nitrogen or phosphorus; or wherein $R_1R_2$ and M represent pyridine and $R_n$ is a ring substituent.

The insolubilized poly(maleic anhydride) according to the invention may be prepared by polymerising maleic anhydride, under anhydrous conditions, in the presence of a polymer having bound thereto an initiator for the maleic anhydride polymerisation reaction. Examples of polymer bound initiators include polystyrene bound phosphines and tertiary amines e.g. polystyryl (diphenyl phosphine) and polystyrene bound pyridine. The polymerisation of maleic anhydride in the presence of tertiary amines and phosphines is known (H. Zweifel, T. Loliger and T. Volker, Makromol. Chem. 1972, 153, 125, and 1973, 170, 141, and D. Braun and J. Pomakis, Makromol. Chem. 1974, 175, 1411).

Polystyrene bound phosphine initiators may be prepared by reaction of a chlorophosphine with a lithiated polystyrene obtained by reacting brominated polystyrene with an excess of n-butyl lithium. The preparation of lithiated polystyrenes and their subsequent reaction with phosphines is described in M. J. Farrall and J. M. J. Frechet, J. Org. Chem. 1976, 41,3877. Thus the polystyrene is first brominated using bromine in the presence of catalytic amounts of thallium (III) salt and then lithiated with an excess of n-butyl lithium in benzene. The resulting lithiated polystyrene is then reacted with e.g. chlorodiphenylphosphine in, suitably, tetrahydrofuran solvent to give the desired polystyryl phosphine product. The degree of substitution of the polystyrene may be controlled by the degree of bromination achieved in the first step, all subsequent steps being substantially quantitative. The degree of bromination can be varied by varying the ratio of bromine to polystyrene used in the first step. Generally satisfactory results can be achieved with material containing diphenylphosphine substituents at 30 to 40% of the polystyrene rings. Introduction of too many diphenylphosphine substituent groups may result in physical breakdown of the polymer structure. On the other hand of course an insufficient number of diphenylphosphine substituents may lead to a commercially insufficiently active polymer.

Polystyrene bound pyridine groups according to the invention may be obtained by reacting chloromethyl polystyrene with 4-picoline in the presence of sodamide using benzene as solvent.

Chloromethyl polystyrene is a known material which can for example be prepared by the chloromethylation of polystyrene using chloromethyl methyl ether in the presence of anhydrous tin (IV) chloride (R. B. Merrifield, J. Am. Chem. Soc., 1963, 85, 2149). Chloromethylated polystyrene is an intermediate in the manufacture of conventional ion exchange resins. Further its use in the present invention has the added advantage that there are obtained polymer beads substantially the same size as the starting polystyrene.

The degree of chloromethylation determines the final functional loading of the polymer as again subsequent steps are substantially quantitative. The degree of chloromethylation used is generally such as to give 1 to 2 mM Cl per g.

The chloromethylated polystyrene is reacted with 4-picoline in the presence of e.g. sodamide using benzene as solvent. This method is essentially a modification of the method of Vogel et al, J. Chem. Soc., 1960, 4454 for the C-alkylation of picolines. Vogel et al carried out the reaction using the picoline in vast excess as solvent. We have found if these conditions are used with the materials used according to the present invention, substantial quaternisation of the nitrogen occurs as an undesirable side reaction. However if there is used as solvent, benzene, successful reaction of the polymer is achieved.

The reaction with 4-picoline according to the invention proceeds according to the following route:

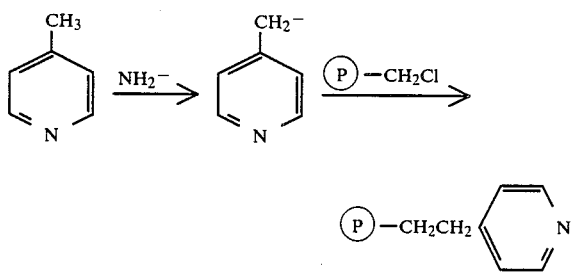

wherein P represents the polystyrene backbone.

This route represents a substantially cheaper method of obtaining initiator bound to polystyrene using relatively cheap reactants than the route involving the more expensive bromination and lithiation steps.

As mentioned above, the polymers according to the present invention are efficient in selectively absorbing from aqueous media heavy metal ions, in particular mercury, zinc and cadmium and especially lead. The polymers are suitable for use as absorbent beds and in columns for water treatment. The polymers may be used in the treatment of effluents and they are also suitable for use in the removal of lead from tap water and indeed other applications in which toxic metal pollution is a problem. The metal capacity of the polymers tends to be pH dependent with the capacity increasing with pH from acid to neutral.

Further the metals can readily be recovered from the polymers according to the invention after use for example by passing a strong acid, such as nitric acid through the polymer column or by stripping the absorbent bed with a strong acid, such as nitric acid. In this way the polymer is also easily and completely regenerated for re-use.

The invention is further illustrated by reference to the following Examples.

EXAMPLE 1

Preparation of polystyrene bound initiators

A. Polystyryl (diphenylphosphine)

This known material was prepared by the routine outlined below and detailed in M. J. Farrall and J. M. J. Frechet, J. Org. Chem. 1976, 41, 3877.

Amberlite XAD-2 resin (a polystyrene resin) was brominated with bromine in the presence of thallium (III) chloride in carbon tetrachloride.

The resulting resin was then treated with n-butyl lithium in benzene followed by chlorodiphenyl phosphine in tetrahydrofuran (THF) to give the desired product.

B. Polystyrene bound pyridine

Dry 4-picoline (22 ml; 224 mmol) and powdered sodamide (2.2 g; 56 mmol) were stirred for 30 min. at 20° C. in dry benzene (50 ml) under dry nitrogen. To this was added chloromethylated polystyrene (5 g; 5.6 mmol Cl residues) and the mixture stirred for a further 18 hours, after which time the reaction mixture, which had turned black, was poured into water (250 ml) to destroy excess sodamide.

The polymer was filtered off, washed thoroughly with water, acetone, benzene and methanol prior to drying at 40° C./0.6 mm for 16 hours.

Yield: 5.1 g of fawn coloured polymer.

EXAMPLE 2

Polymerisation of Maleic Anhydride

A. Polystyryl (diphenylphosphine) initiated polymerisation—Preparation of Polymer 1

To maleic anhydride (100 g; 1.02 mol) at 120° C. under dry nitrogen was added, with stirring, polystyryl (diphenylphosphine) (45 g; 16.5 mmol—PPh$_2$ residues; Ph=phenyl). After 3 hours the reaction mixture was allowed to cool to ca. 50° C. and acetone (200 ml) added to dissolve unreacted maleic anhydride. Polymer was filtered off on a sinter and washed with acetone, water, and finally acetone, before drying at 40° C./0.6 mm for 16 hours to yield 18.7 g of brown polymer beads.

B. Polystyrene bound pyridine initiated polymerisation—Preparation of Polymer 3

The procedure was as described above for the polystyrene (diphenylphosphine) initiated polymerisation except that reaction time was 5 hours.

20 g of polymer bound pyridine (22 mmol pyridine residues) obtained in Example 1B above and 150 g maleic acid yielded 25.6 g of a brown polymer.

EXAMPLE 3

Measurement of the capacity of the Polymers to absorb metals, general method.

The capacity of the polymers obtained as in Example 2 above as metal adsorbents by the use of a simple flow system was as follows:

1 g of beads of the polymer to be tested were slurry packed in 100 ml deionised water into a 13 mm (internal diameter) glass column. The water was drained and a test metal ion solution allowed to flow through the column at 75 ml. hour$^{-1}$. The column effluent was collected in 25 ml fractions analysed by atomic absorption, or, in the case of zinc, by titration with ethylenediaminetetraacetic acid (EDTA).

Figure 2:
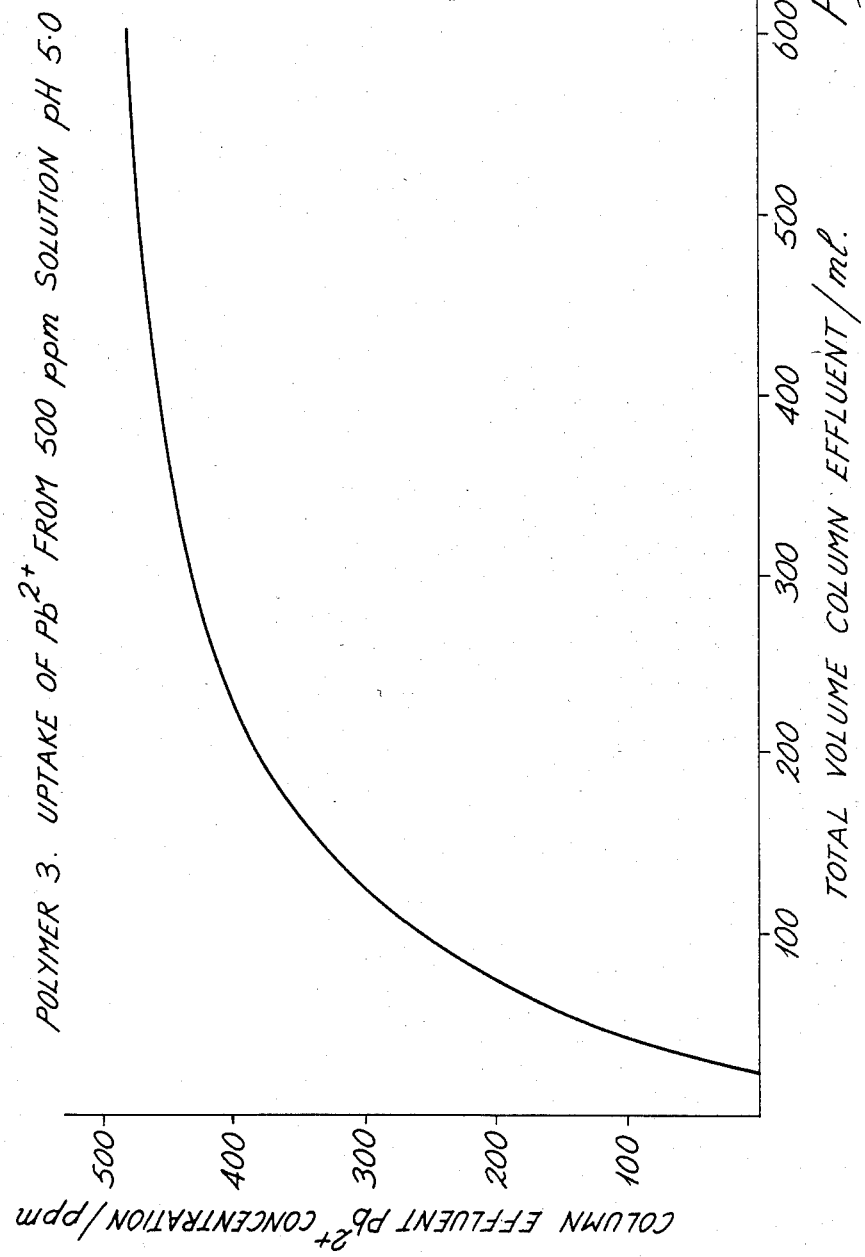

The results of these experiments for three different polymers are shown in the following Table. In addition the FIGS. 1 and 2 of the accompanying drawings show typical elution curves for the uptake of lead by a column containing Polymer 1 and one containing Polymer 3 respectively using the same method. The capacities quoted in the following Table are determined from such curves.

| Polymer | Metal | Column Feed Concentration | pH | Capacity of polymer |
|---|---|---|---|---|
| 1 | $Fe^{3+}$ | 100 ppm | 3.0 | 0.051 mmol g$^{-1}$ |
| 1 | $Pb^{2+}$ | 15 ppm | 2.2 | nil |
| 1 | $Pb^{2+}$ | 500 ppm | 5.0 | >0.27 mmol g$^{-1}$ |
| 1 | $Cd^{2+}$ | 500 ppm | 4.0 | 0.07 mmol g$^{-1}$ |
| 1 | $Zn^{2+}$ | 500 ppm | 5.1 | 0.02 mmol g$^{-1}$ |
| 2 | $Hg^{2+}$ | 500 ppm | 4.4 | 0.16 mmol g$^{-1}$ |
| 2 | $Cd^{2+}$ | 500 ppm | 4.0 | 0.12 mmol g$^{-1}$ |
| 2 | $Pb^{2+}$ | 500 ppm | 5.0 | >0.35 mmol g$^{-1}$ |
| 3 | $Pb^{2+}$ | 500 ppm | 5.0 | ~0.42 mmol g$^{-1}$ |
| 3 | $Hg^{2+}$ | 500 ppm | 4.4 | 0.07 mmol g$^{-1}$ |
| 3 | $Zn^{2+}$ | 500 ppm | 5.1 | 0.09 mmol g$^{-1}$ |
| 3 | $Cd^{2+}$ | 500 ppm | 4.0 | 0.08 mmol g$^{-1}$ |
| 3 | $Cu^{2+}$ | 500 ppm | 4.2 | nil |
| 3 | $Pb^{2+}$ | 15 ppm | 4.8 | Concentration in effluent* 1 ppm after 400 ml |
| 3 | $Pb^{2+}$ | 2 ppm | 5.5 | <0.04 ppm after 550 ml passed through column |

Polymer 1 - from polystyryl (diphenylphosphine) prepared from bromoplystyrene with 1.1 mmol Br g$^{-1}$ (obtained in Example 2A above).
Polymer 2 - obtained as for polymer 1 but from polystyryl(diphenylphosphine) prepared from bromo-polystyrene with 2.9 mmol Br g$^{-1}$ as initiator.
Polymer 3 - from polymer bound pyridine from chloromethylpolystyrene with 1.1 mmol Cl g$^{-1}$ (obtained in Example 2B above).
*Saturation of the polymer was not reached in these experiments.

DISCUSSION OF RESULTS

Comparison of the capacities for Polymers 1 and 2, which are of the same type but with different maleic anhydride loadings, shows that the capacity for metals is not directly proportional to the functional group loading and that high loadings are not necessarily beneficial.

Polymer 3 is quite satisfactory for lead adsorption although inferior to Polymer 2 for mercury and cadmium adsorption.

EXAMPLE 4

The metals were completely stripped from the polymers of Example 3 using 2M nitric acid (25 ml g$^{-1}$ polymer). The regenerated polymer exhibited exactly the performance of the newly prepared material. There was no evidence that the performance deteriorated over repeated saturation regeneration cycles.

We claim:

1. A process for removing a heavy metal from a fluid medium comprising
   (1) bringing a fluid medium containing at least one heavy metal selected from the group consisting of lead, mercury, zinc, iron, cadmium and mixtures thereof into contact with a heavy-metal-absorbing medium, and
   (2) allowing said absorbing medium to absorb at least some of said heavy metal from said fluid medium, said absorbing medium being capable of selectively absorbing said heavy metal over relatively innocuous metals and comprising a poly(maleic anhydride) polymer having IR absorption maxima at 3,480–3,500 cm$^{-1}$, 1,670–1,690 cm$^{-1}$ and 1,190–1,210 cm$^{-1}$, said polymer having been rendered insoluble and non-swellable by polymerization in the presence of a Lewis base polymerization initiator bound to a support material which is insoluble in aqueous and organic media.

2. A process for removing a heavy metal from a fluid medium comprising
   (1) bringing a fluid medium containing at least one heavy metal selected from the group consisting of lead, mercury, zinc, iron, cadmium and or mixtures thereof into contact with a heavy-metal-absorbing medium,
   (2) allowing said absorbing medium to absorb at least some of said heavy metal from said fluid medium, and
   (3) contacting said absorbing medium following absorption of said heavy metal with a strong acid to remove said heavy metal from said absorbing medium,
   said absorbing medium being capable of selectively absorbing said heavy metal over relatively innocuous metals and comprising a poly(maleic anhydride) polymer having IR absorption maxima at 3,480–3,500 cm$^{-1}$, 1,670–1,690 cm$^{-1}$ and 1,190–1,210 cm$^{-1}$, said polymer having been rendered insoluble and non-swellable by polymerization in the presence of a Lewis base polymerization initiator bound to a support material which is insoluble in aqueous and organic media.

3. A process according to claim 1 or 2 wherein said poly(maleic anhydride) is contained in an absorbent bed or column through which said fluid medium is passed.

4. A process according to claim 1 or 2 wherein said heavy metal comprises lead.

5. A process according to claim 2 wherein said strong acid comprises nitric acid.

6. A process according to claim 1 or 2 in which said poly(maleic anhydride) has been insolubilized by copolymerization of poly(maleic anhydride) or monomeric maleic anhydride with a hydrophobic polymer.

7. A process according to claim 6 wherein said hydrophobic polymer comprises a substituted or unsubstituted polystyrene.

8. A process according to claim 1 or 2 wherein said polymerization is effected under anhydrous conditions.

9. A process according to claim 1 or 2 wherein said Lewis base comprises a compound of the formula:

$$R_n R_1 R_2 M$$

wherein:
$R_n$ represents a monovalent hydrophobic polymeric group;
$R_1$ and $R_2$, which may be the same or different, each represent a substituted or unsubstituted hydrocarbyl group or, together with M, represent a heterocyclic moiety; and M represents an element of Group VB of the Periodic Table.

10. A process according to claim 9 wherein $R_n$ represents a polystyryl group.

11. A process according to claim 10 wherein at least one of $R_1$ and $R_2$ represents a phenyl group.

12. A process according to claim 11 wherein M represents nitrogen or phosphorous.

13. A process according to claim 12 wherein $R_1$, $R_2$ and M represents pyriddine and $R_n$ is a ring substituent.

14. A process according to claim 1 or 2 wherein said absorbing medium is capable of selectively absorbing said heavy metal over alkali and alkaline earth metals.

15. A process according to claim 1 or 2 wherein said fluid medium is an aqueous medium.

16. A process according to claim 15 wherein said aqueous medium is an aqueous effluent contaminated with said heavy metal.

* * * * *